United States Patent [19]
Oshiba et al.

[11] Patent Number: 5,293,568
[45] Date of Patent: Mar. 8, 1994

[54] TRACK-ADDRESS JUDGING METHOD

[75] Inventors: Mitsuo Oshiba, Hachioji; Kazutake Sugawara, Mitaka, both of Japan

[73] Assignee: Olympus Optical Co., Ltd., Tokyo, Japan

[21] Appl. No.: 904,036

[22] Filed: Jun. 25, 1992

[30] Foreign Application Priority Data

Jun. 28, 1991 [JP] Japan .................. 3-158822
Jun. 28, 1991 [JP] Japan .................. 3-158824

[51] Int. Cl.$^5$ .................................. G11B 17/22
[52] U.S. Cl. .................... 369/32; 369/44.37; 369/47; 369/50; 369/124; 235/440; 235/437; 235/456; 235/494
[58] Field of Search ........... 369/32, 44.37, 47, 48, 369/50, 54, 124; 235/440, 437, 436, 454, 456, 494

[56] References Cited

U.S. PATENT DOCUMENTS

| | | | |
|---|---|---|---|
| 4,660,191 | 4/1987 | Maeda et al. | 369/44.37 |
| 4,787,076 | 11/1988 | Deguchi et al. | 369/44.37 |
| 5,023,860 | 6/1991 | Ueda | 369/44.37 |
| 5,159,589 | 10/1992 | Oshato | 369/44.37 |

FOREIGN PATENT DOCUMENTS 2-141932  5/1990  Japan .

Primary Examiner—Robert J. Pascal
Assistant Examiner—R. A. Ratliff
Attorney, Agent, or Firm—Armstrong, Westerman, Hattori, McLeland & Naughton

[57] ABSTRACT

The present invention reads out track addresses written onto ID sections of a recording medium, for example, from five, tracks of the plurality of tracks read out simultaneously, to execute demodulation and error correction. In case where the addresses are multiple-written onto the ID sections, the optical spot judges the track address of the desired track on the basis of the plurality of read-out track addresses until the optical spot passes through the remaining track address. Further, in case where there is only a single one of the track addresses written on said ID sections, the track addresses are read out one by one, are demodulated and are error-corrected. The track address of the desired track is judged on the basis of the plurality of read-out track addresses, prior to the fact that the optical spot enters an information recording area.

14 Claims, 10 Drawing Sheets

TRACK-ADDRESS JUDGING METHOD

BACKGROUND OF THE INVENTION

1. Field of the Invention

The present invention relates to a method for judging track addresses of a desired track, in an optical information recording and reproducing (playback) apparatus which simultaneously executes at least one of recording and reproducing of information with respect to a plurality of tracks.

2. Description of the Related Art and Prior Art Statement

A recording medium such as an optical card, an optical disc or the like has a plurality of tracks extending in parallel relation to each other, or extending in concentric relation to each other. On the other hand, an optical information recording and reproducing apparatus comprises an optical head for optically recording/reproducing information with respect to the recording medium. The arrangement is such that the recording medium and the optical head are reciprocated or rotatively moved in a track direction of the recording medium and in a direction perpendicular thereto, to execute recording-/reproducing of the information.

In a conventional optical information recording and reproducing apparatus, an apparatus is generally known which is of single-track reading-out type in which a single light beam from an optical head is irradiated onto a single track, and reading-out of the information is executed by a unit of a single track.

In this method, however, a reproducing rate or speed of the information recorded on the track is determined depending on a relative speed between the optical head and the recording medium, and it has been impossible to further raise the reproducing speed. In order to solve this problem, an apparatus has been derived in which an outgoing light from the optical head is irradiated to a plurality of tracks, and reading-out of the information is simultaneously executed from the plurality of tracks. That is, the apparatus is an optical information recording and reproducing apparatus of a type which reads out a plurality of tracks. As an example, the applicant of the present invention has proposed an apparatus in which an attempt is made to reduce a number of PLL (Phase-Locked Loop) circuits and a demodulation circuit, to small-scale a data processing system, by a number of tracks read out, in Japanese Patent Laid-Open No. 2-141932/1990.

The recording medium will be described, for example, as an optical card. As shown in FIG. 6, a plurality of tracks 32 extend in an optical card 30. One of the tracks 32 is arranged by a single sector, or, as shown in FIG. 7, a plurality of sectors. The single track has an information recording area (DATA) 35 onto which writing of the information is at least executed, and a pair of ID sections 34a and 34b arranged at both ends of the information recording area 35, in which track address information and the like are recorded. In FIG. 7, the left-hand ID section 34a is used in case where the information recording area 35 is accessed from the left. On the other hand, the right-hand ID section 34b is used in case where the information recording area 35 is accessed from the right.

In connection with the above, the information recording area 35 illustrated in FIG. 7 is divided into N sectors. The sectors are so arranged as to clamp or nip therebetween buffering areas on which nothing is recorded, called a gap (GAP), in order to absorb unevenness or irregularity of a transporting or carrying speed of the optical card 30. Gaps are also provided respectively between the sectors and the ID sections.

A method of judging a track address recorded on the ID 34a or 34b will next be described with reference to FIG. 1, as an example of an optical-card recording and reproducing apparatus of single track reading-out type. The optical-card recording and reproducing apparatus reads out any one of the ID sections provided on the both ends of the track 32, and judges the track addresses on the basis of the results of the reading-out, and recording or reproducing of the information is executed with respect to the information recording area.

As shown in FIG. 1, each of the ID sections 34a and 34b has five IDs ($ID_0$ to $ID_4$), for example. Each of the IDs includes the same track address information, and is normally coded in error revision or correction. That is, a plurality of track addresses are written onto the ID section of the single track, that is, so-called multiple writing is executed.

In the optical information recording and reproducing apparatus, erroneous recognition of the track addresses causes the information already recorded to be broken, and erroneous information is read out. Accordingly, it is necessary to reduce the probability of the erroneous recognition of the track addresses as much as possible. For this purpose, there are five IDs. The probability of erroneous recognition is lowered by the fact that the track addresses are judged on the basis of the reading results of the five IDs.

Further, although the track addresses within each of the IDs are coded in error correction, erroneous correction may also occur. Accordingly, there are many cases where judgment of the track addresses is executed taking coincidence or agreement of the track addresses within the five IDs. For example, in a case where access is executed from the left in FIG. 1, an optical head successively scans, by the optical beam, $ID_0$ to $ID_4$ of the track on which there is the optical card 32 and reads out the same, and the demodulated track addresses are stored in a memory or the like. In this case, since the five IDs are completed for the first time at a time the optical beam passes through the $ID_4$ judgment of the track addresses starts from time of the completion, as illustrated in FIG. 1.

The conventional optical information recording and reproducing apparatus of type of reading out the plurality of tracks is also so arranged as to execute judgment of the track addresses by the similar processing.

In connection with the above, it is needless to say that the apparatus of type of reading out the plurality of tracks can also be used as an apparatus for reading out a single track.

Now, as mentioned previously, in the conventional optical information recording and reproducing apparatuses of type of reading out the single track or type of reading out the plurality of tracks, judgment of the track addresses is the same in both the apparatuses. That is, judgment of the track addresses has been executed after the optical beam outgone by the optical head has passed through all the areas of the ID sections on which the track addresses are multiple-written.

In case where recording and reproducing of the information are executed with respect to the information recording areas, the above-mentioned apparatus judges whether or not the track address is a desired track address. After having judged the desired track, the apparatus recognizes a sector starting position, and must command to start recording operation or reproducing operation with respect to a recording circuit or a reproducing circuit. For this reason, judgment of the track addresses must be executed and completed within a period of time an optical spot passes through the gap portions in FIG. 7. If the judgment is not completed within the period of time, the optical spot reaches the sector starting position before starting of recognition of the sector starting position. Accordingly, it is necessary to execute the judgment of the track addresses quickly. In this connection, the fact that the optical spot reaches the sector starting position prior to the judgment means that recording/reproducing of information cannot be executed.

On the other hand, it is required for the recording medium such as an optical card that each of the gap portions is limited or narrowed as far as possible, in order to increase the memory capacity. Accordingly, there is a further need to execute the judgment of the track addresses quickly.

Execution of the judgment of the track address quickly has the following disadvantages. That is, required are the use of a high-speed CPU and accompanying speed-up of peripheral circuits, or addition of a hardware for judgment of the track addresses in the apparatus of a type for reading out the plurality of tracks. Thus, this raises the cost of the apparatus.

Furthermore, as previously described, the recording medium has been arranged such that, in order to suppress or restrain an erroneous ratio or rate of track-address recognition low as far as possible, the track addresses are multiple-written onto the single ID section within the single track. This has been the same in recording medium used for any of apparatuses of type of reading out a single track or a plurality of tracks.

However, the multiple writing has an advantage that the erroneous recognition rate of the address is lowered or reduced to improve the reliability of recording/reproducing of the information, while the multiple writing has a disadvantage that the storing or memory capacity of the information recording area of the recording medium is restricted or limited and is reduced.

SUMMARY OF THE INVENTION

It is an object of the present invention to provide a track-address judging method in which, in an optical information recording and reproducing apparatus of type of reading out a plurality of tracks, an attempt is made for speed-up of judgment of track addresses, without imposing more hardware on the apparatus than is necessary.

It is another object of the present invention to provide a track-address judging method in which, in an optical information recording and reproducing apparatus of type of reading out a plurality of tracks, track addresses are not multiple-written on an ID section of a recording medium, and an erroneous rate of track address recognition can be kept low.

Briefly, a track-address judging method according to the present invention is a track judging method of judging track addresses of a desired one of a plurality of tracks. The track judging method comprises a step of reading a multiple-written track address of the track addresses from at least two tracks of the plurality of tracks read out simultaneously, and judging the track address of the desired track, on the basis of the track addresses read out from the at least two tracks, in the step of reading, during a period of time for which an optical spot reaches an information recording area from the multiple-written remaining track addresses.

Further, briefly, another track-address judging method according to the invention comprises a step of reading out track addresses on which only one of track address information sections is written, from at least two tracks of a plurality of tracks read out simultaneously, and a step of judging the track addresses of a desired track, on the basis of the track addresses read out from at least two tracks different from each other, in the reading-out step, within a period of time an optical spot reaches an information recording area.

Other advantages and features of this invention will sufficiently become clear from the following detailed description with reference to the accompanying drawings.

BRIEF DESCRIPTION OF THE DRAWINGS

FIG. 5a is a flow chart of a modification of the track-address judging method shown in FIG. 5.

DETAILED DESCRIPTION OF THE PREFERRED EMBODIMENTS

Various embodiments of the invention will hereunder be described with reference to the accompanying drawings.

FIGS. 2 through 7 are views showing a first embodiment of the invention.

A track-address judging method according to the first embodiment will be described as an example of an optical card 30 serving as a recording medium illustrated in FIG. 6, and an optical card apparatus 1 serving as an optical information recording and reproducing apparatus illustrated in FIG. 2. The optical card apparatus 1 is an apparatus of a type for reading out a plurality of tracks.

Figure 6:
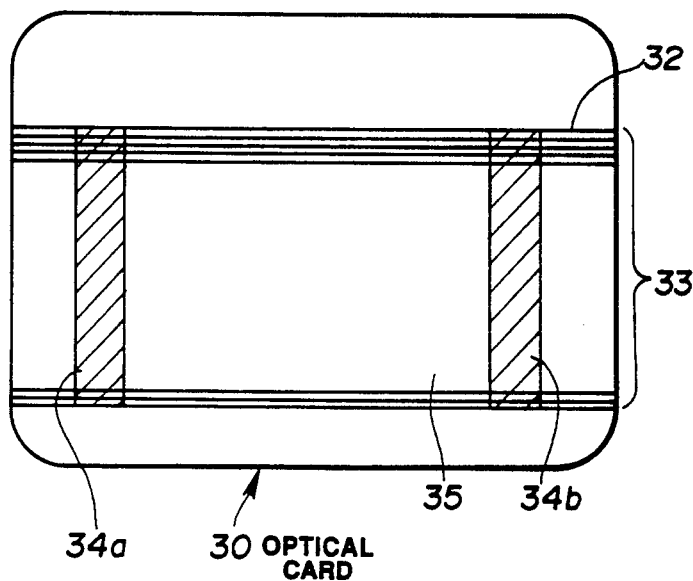
FIG. 6 is a view showing an entire arrangement of an optical card.

As shown in FIG. 6, the optical card 30 is formed with a plurality of tracks 32 running in a longitudinal direction of the card, and is provided with a recording area 33 consisting of the plurality of tracks 32. Each of the tracks 32 in the recording area 33 is provided with a pair of ID sections 34a and 34b, each serving as a track-address information section, at locations adjacent respectively to both ends of the card at the short sides thereof. Track addresses corresponding respectively to the tracks are multiple-written on the ID sections 34a and 34b, so as to be readable from directions opposite each other.

Figure 4:
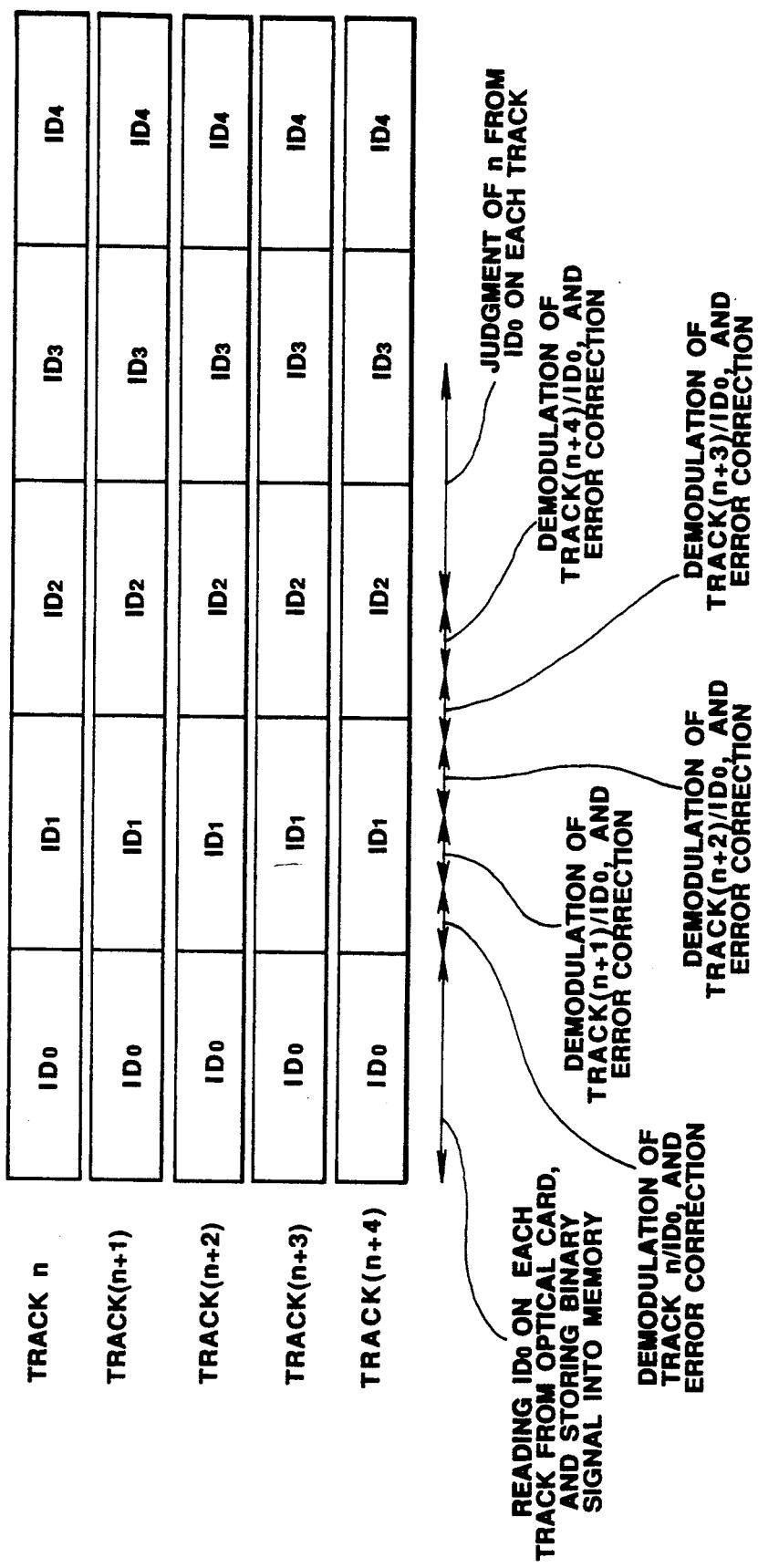
FIG. 4 is a view for explanation, showing reading-out of track addresses and judgment thereof.

As shown in FIG. 4, for example, the ID section 34a is provided in order from left to right in the figure with $ID_0$, $ID_1$, $ID_2$, $ID_3$ and $ID_4$ on which the same track addresses corresponding respectively to the tracks are recorded. Moreover, the ID section 34b has $ID_0$, $ID_1$, $ID_2$, $ID_3$ and $ID_4$ in order from a direction opposite to the ID section 34a.

When the optical card 30 moves from the left to the right in FIG. 4 in the track direction, with respect to the optical head, the ID section 34a is read out so that the track addresses corresponding respectively to the tracks can be recognized. Further, when the optical card 30 moves from the left to the right in FIG. 4 in the track direction with respect to the optical head, the optical card apparatus 1 reads out the ID section 34b, and the track addresses corresponding, respectively, to the tracks can be recognized.

In connection with the above, in order to prevent the effect or influence of defects, dirt and the like on the card end, and in order to sufficiently stabilize a relative speed between the optical card 30 and the optical head in the track direction, the ID sections 34a and 34b are provided inside a predetermined distance (approximately 4 mm, for example) respectively from the ends of the card. Furthermore, the ID sections 34a and 34b are pre-formatted beforehand during manufacture of the optical card.

Figure 7:
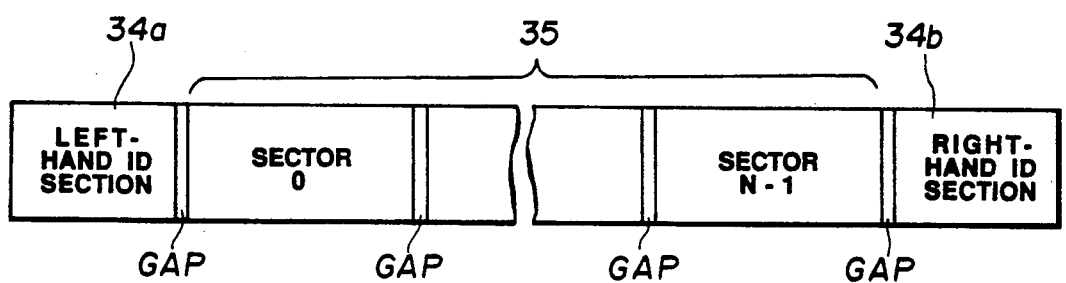
FIG. 7 is a schematic arrangement view, showing an example of format of a track.

Moreover, each track 32 in the recording area 33 has an information recording area 35 in which writing of the information is executed between the ID sections 34a and 34b. As shown in FIG. 7, for example, the information recording area 35 is divided into N sectors. The arrangement is such that a buffering area called a "GAP" on which nothing is recorded is placed between each pair of adjacent sectors. Further, similarly, gaps are defined also between the sectors and the ID sections 34a and 34b, respectively.

Figure 1:
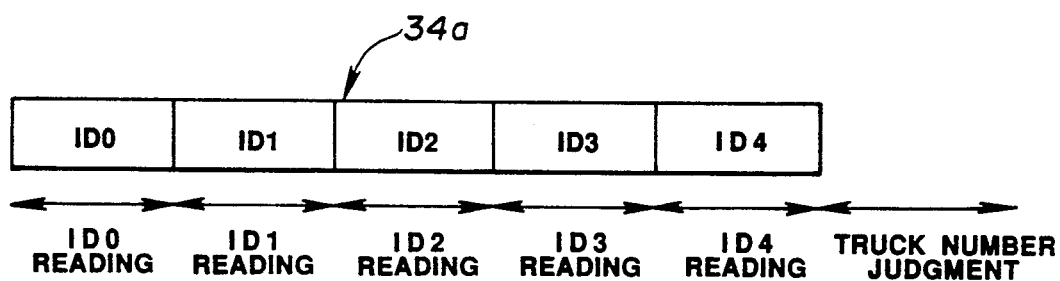
FIG. 1 is a view for explanation, showing reading-out of track addresses and judgment thereof of prior art.
Figure 2:
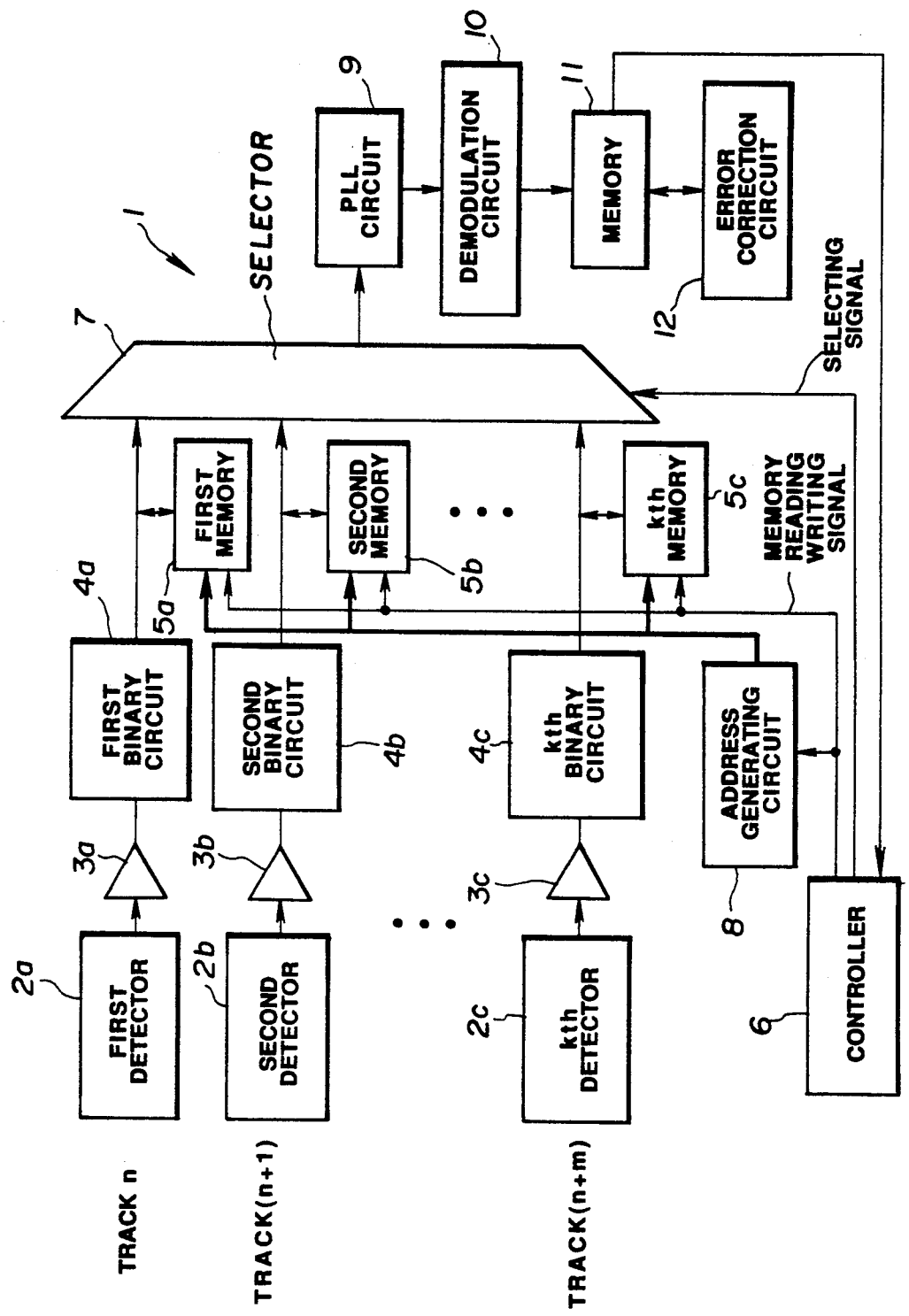
FIG. 2 is a block diagram showing an example of a reproducing circuit of an optical recording and reproducing apparatus.

On the other hand, the optical card apparatus 1 illustrated in FIG. 2 is an apparatus which executes recording/reproducing of information with respect to the plurality of tracks on the optical card 30.

The optical card apparatus 1 has an optical head (not shown) which irradiates k recording/reproducing beams simultaneously to k tracks 32 on the optical card 30. The optical head is so arranged as to irradiate optical spots simultaneously onto optional k (=m+1) tracks n, (n+1), ..., (n+m) on the optical card 30, through an optical system comprising a light source and an objective lens (not shown). In this connection, a reproducing light beam may be a single beam which irradiates simultaneously the plurality of tracks.

Furthermore, the optical head is provided with a first optical detector 2a, a second optical detector 2b, ... a k optical detector 2c illustrated in FIG. 2, and is arranged such that light reflected from the track n, the track (n+1), ..., the track (n+m) of the optical card 30 is converted to an electrical signal, and the same is outputted.

The electrical signal outputted from the first optical detector 2a corresponds to information on the track n, as shown in FIG. 2. After having been passed through a first amplifier 3a, the electrical signal is converted into a binary signal by a binary circuit 4a and is outputted. This binary signal is inputted into a data input terminal of a memory 5a, and is stored therein. Furthermore, the arrangement is such that the stored binary signal is read out from a data output terminal of the memory 5a, and is inputted into a selector 7.

The electric signal outputted from the second optical detector 2b is information on the track (n+1), and is converted into a binary signal by the binary circuit 4b after having been passed through a second amplifier 3b. This binary signal is inputted into the data input terminal of the memory 5b and into the selector 7. Moreover, the arrangement is such that the stored binary signal is read out from the data output terminal of the memory 5b, and is inputted into the selector 7.

The optical card apparatus 1 is provided with a similar arrangement, in order to hereunder read out the track (n+2) to the track (n+m) likewise. As shown in FIG. 2, the arrangement including a kth optical detector 2c, a kth amplifier 3c, a kth binary circuit 4c and a kth memory 5c corresponds to the track (n+m).

A controller 6 illustrated in FIG. 2 comprises a CPU and a timing generator, and controls timing of writing and reading-out of the memories 5a to 5c.

An address generating circuit 8 illustrated in FIG. 2 generates addresses at timing of a memory read/write signal which is outputted by the controller 6, to output the addresses to the first memory 5a, the second memory 5b and the kth memory 5c. The first memory 5a stores the binary signal outputted from the binary circuit 4a to the addresses generated by the address generating circuit 8 in order, at timing of the memory read/write signal. Further, the second memory 5b to the kth memory 5c are likewise arranged.

Furthermore, the memory 5a, the memory 5b... the memory 5c output the binary signals stored, respectively to the selector 7, at timing of the memory read/write signal. The selector 7 selects the binary signals outputted from the memory 5a, the memory 5b... the memory 5c, in accordance with a select signal outputted by the controller 6, and outputs any of them to a PLL (Phase-Locked Loop) circuit 9. This select signal is so set as to select a binary signal in order of the track n, the track (n+1), ... the track (n+m), for example.

The PLL circuit 9 generates a bit synchronizing signal on the basis of the given binary signal, and outputs the same to a demodulator circuit 10. The demodulator circuit 10 generates a data demodulation signal on the basis of the binary signal and the bit synchronizing signal, and outputs a data demodulation signal to the memory 11. The memory 11 once stores the data demodulation signal. An error correction circuit 12 applies error correction processing to the stored data modulation signal. The memory 11 again stores the data demodulation signal completed in error correction, and outputs the data demodulation signal to the controller 6. The controller 6 reads out the track addresses of the $ID_0$ of the data demodulation signal, and executes judgment on the track addresses to be described subsequently.

Figure 3:
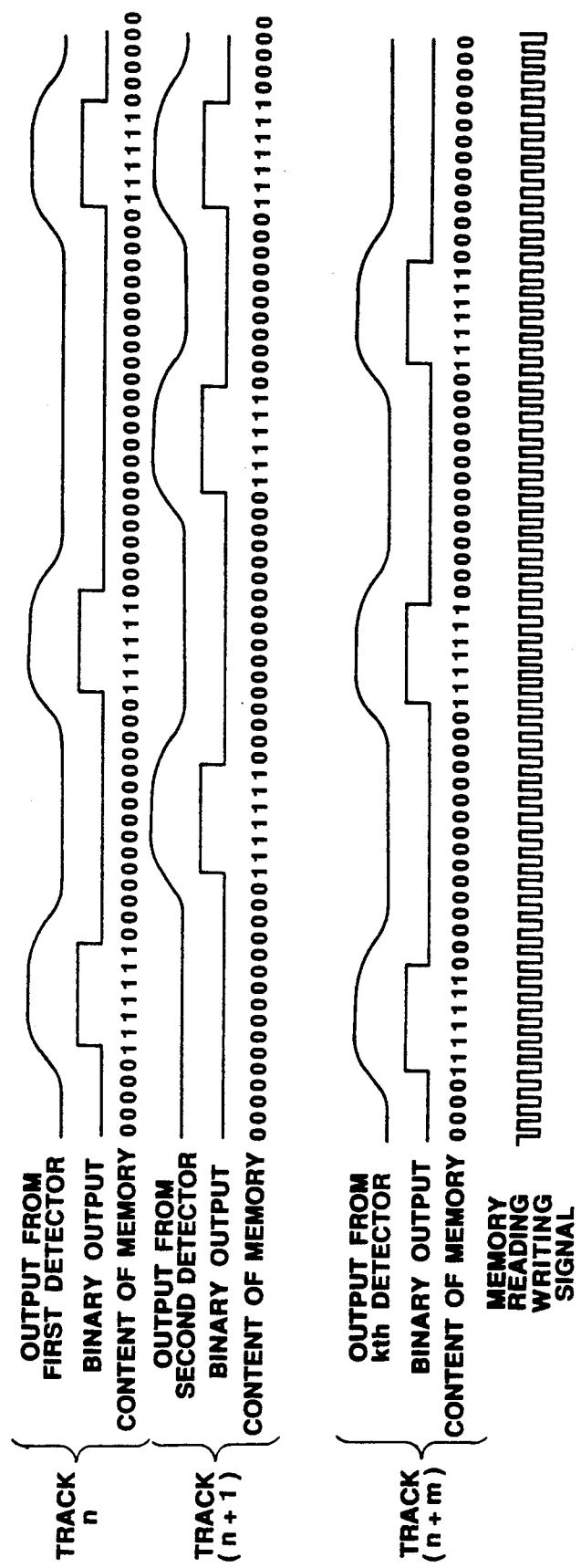
FIG. 3 is a timing chart showing operation of the apparatus illustrated in FIG. 2.

Referring to FIG. 3, operation of the optical card apparatus 1 will be described. In this connection, for convenience of description, the optical detectors 2a and 2b... 2c will generically be named as "each optical detector 2". The amplifiers 3a, 3b... 3c will generically be named as "each amplifier 3". Moreover, the binary circuits 4a, 4b... 4c will generically be named as "each binary circuit 4".

A light reflected from the track n, the track (n+1), and the track (n+m), which are obtained by irradiation of a reading-out light, is converted into electrical signals by the first optical detector 2a, the second optical detector 2b... the kth optical detector 2c. A portion in which an amplitude of a waveform illustrated in FIG. 3 is large corresponds to a pit formed on the track 32. The electric signal from each optical detector 2 is binary-coded by each binary circuit 4 through each amplifier 3. The memory read/write signal is generated from the inside timing generator on the basis of the starting command of the CPU of the controller 6.

As shown in FIG. 3, each of the memories 5 samples a binary output from each binary circuit 4, at an edge of leading of the memory read/write signal, and stores the same. FIG. 3 shows values stored in the first, second... kth memories 5 as memory contents.

If sampling error is considered, generally, in recording/reproducing due to light or magnetism, fluctuation or jitter in a time-axis direction occurs. Sampling error of the memory can also be considered as jitter. If an amount of jitter due to sampling of the memories can be restrained approximately 5%, there is no large influence in reproduction of the data. Since, in case of the optical card, a reading-out speed is approximately 10 kbit/sec to 100 kbit/sec, the amount of jitter can be restrained approximately 5%, if the frequency of the read/write signal is brought approximately to 500 kHz or 5 MHz.

The addresses generated by the address generating circuit 8 are generated at timing of the memory read/write signal. Each of the memories 5 samples the binary signal every track, and stores the same in an assigned address. The stored binary signal is read out at timing of the memory read/write signal, and is inputted into the selector 7. The selector 7 supplies the binary signal to the PLL circuit 9 and the demodulation circuit 10, successively, in accordance with the select signal. The binary signal is demodulated through the PLL circuit 9 and the demodulation circuit 10.

In connection with the above, each data of each memory 5 is successively read out in order of the addresses assigned by the address generating circuit 8. The reading-out speed from the memory is increased up to the maximum reading-out frequency determined by an element per se of the memory, whereby an attempt can be made to speed up the demodulation speed.

The method of judging track addresses, according to the first embodiment, will next be described with reference to FIGS. 4 and 5, as an example of a case where the optical card 30 is mounted on the optical card apparatus 1, to read out the information. In this connection, it is assumed that five tracks are simultaneously read out, as illustrated in FIG. 4, for simplification of the description.

FIG. 4 shows the operational contents, following the order, at the time the optical beam from the optical head passes through the left-hand ID section 34a of the five tracks.

First, when the optical beam passes through the area of the $ID_0$, the $ID_0$s on the tracks n, (n+1), (n+2), (n+3) and (n+4) are read out simultaneously from the optical card 30, are binary-coded, and are stored, respectively, in the memories 5.

At the time the optical beam passes through the $ID_0$, the memory 5a on which the binary signal of the $ID_0$ on the track n is stored is read out to execute demodulation, and the error correction results are stored in the memory 11. Subsequently, the memory 5b on which the binary signal of the $ID_0$ on the track (n+1) is stored is read out to execute demodulation, and the error correction results are stored in the memory 11. Hereunder, similar operations are executed respectively on the $ID_0$s on the tracks (n+2), (n+3) and (n+4). These operations can be executed, with a high speed of the demodulating speed, by raising the reading-out speed of the memory 5, as described previously.

Accordingly, it is easy to complete the operation before the optical head passes through the area of the ID section 34a or 34b. It is sufficient if judgement of the track addresses is executed within a period of time the optical spot from the optical head reaches the information recording area 35 from the multiple-written remaining track addresses, that is, within the remaining time the optical spot passes through the ID section 34a or 34b and further passes through the gaps, on the basis of the error correction results of the $ID_0$ on each track.

Figure 5:
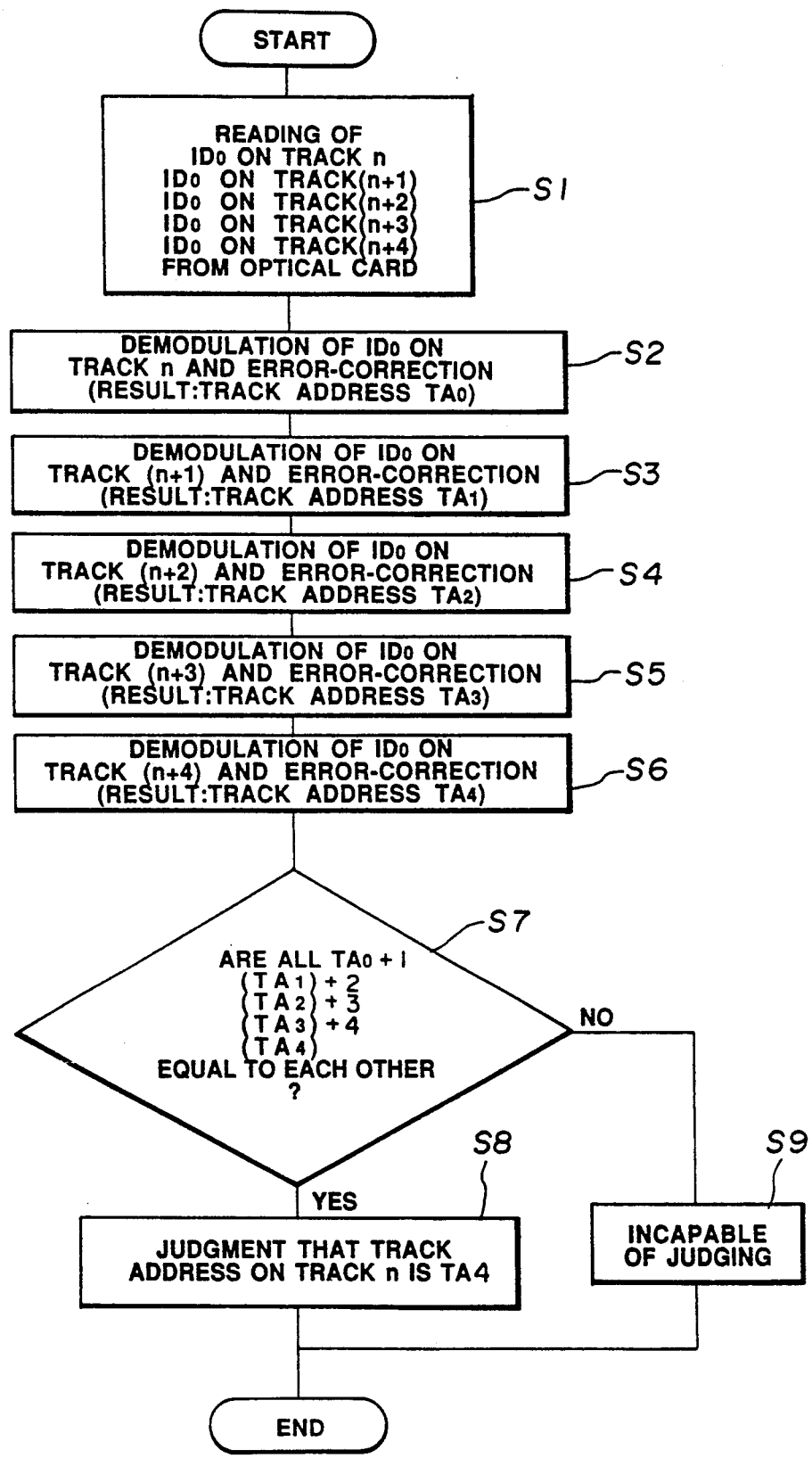
FIG. 5 is a flow chart of a track-address judging method.

FIG. 5 shows an example of a flow chart of the track-address judging method according to the first embodiment.

First, in a step S1, when the optical head passes through the area of $ID_0$, $ID_0$s on the tracks n, (n+1), (n+2), (n+3) and (n+4) are simultaneously read out from the optical card 30, are binary-coded, and are respectively stored in the memories 5. In a step S2, the memory 5a in which the binary signal of $ID_0$ on the track n is stored is read out at time the optical head passes through the $ID_0$, and demodulation is executed. Error correction processing is executed to obtain a track address $TA_0$. The track address $TA_0$ is stored in the memory 11.

Subsequently, in a step S3, the memory 5b in which the binary signal of $ID_0$ on the track (n+1) is stored is read out, and demodulation is executed. Error correction processing is executed. Thus, a track address $TA_1$ is stored in the memory 11. Hereunder, in a step S4 to a step S6, similar operation is executed with respect to $ID_0$ on tracks (n+2), (n+3) and (n+4), to obtain track addresses $TA_2$ to $TA_4$.

Subsequently, in a step S7, comparison between $TA_0$, $(TA_1)-1$, $(TA_2)-2$, $(TA_3)-3$ and $(TA_4)-4$ is executed by the controller 6, with respect to the obtained track addresses, and it is judged whether or not all the values are in agreement with each other. In case where all the values are in agreement with each other, it is judged in a step 8 that the address of the objective track n is $TA_0$, and the program is completed as being "normal".

Another option for step S7, as shown in FIG. 5a, is a comparison between $(TA_0)+1$, $(TA_1)+2$, $(TA_2)+3$, $(TA_3)+4$, and $TA_4$ and judging whether or not the values are in agreement. If so, step S8 judges that the address of the objective track is $TA_4$.

On the other hand, in case where all the values are not in agreement with each other, judgment cannot be executed at a step 9, and the program is completed as being "abnormal".

If it is confirmed that the light beam is positioned at the target track n on the basis of the judgment results, the information on the track n or, the track n to the track (n+4) is read out, or operation starts in which the information is recorded onto an optional track of the track n to the track (n+4).

In connection with the above, although description has been made to the left-hand ID 34a in the figures, it is needless to say that the operation similar can be executed if the right-hand ID 34b is used.

Figure 10:
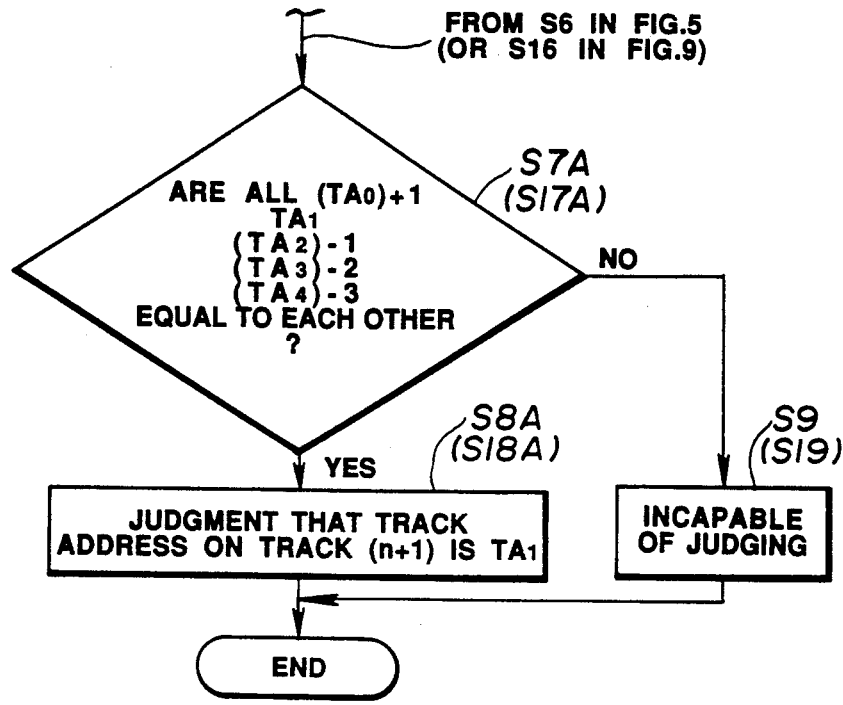
FIG. 10 is a flow chart showing a modification of the track-address judging method.

A modification of the flow chart illustrated in FIG. 5 will next be described with reference to FIGS. 10 to 12.

In a first modification, if an operation expression is changed for comparison so as to be $TA_0+1$, $(TA_1)$, $(TA_2)-1$, $(TA_3)-2$ and $(TA_4)-3$, there is provided a track address $(TA_1)$ on the track $(n+1)$. An example of such computation is illustrated in FIG. 10. In this flow chart, judgment in a step S7A is executed in place of the step S7 in FIG. 5, after the step S6 in FIG. 5. In this first modification, in the step S7A, it is judged whether or not all $TA_0+1$, $(TA_1)$, $(TA_2)-1$, $(TA_3)-2$ and $(TA_4)-3$ are in agreement with each other. Subsequent steps S8A and S9 are the same as those in FIG. 5. Further, even in the other tracks $TA_2$ to $TA_4$, if the operation expression is changed, there are produced similar results.

Figure 11:
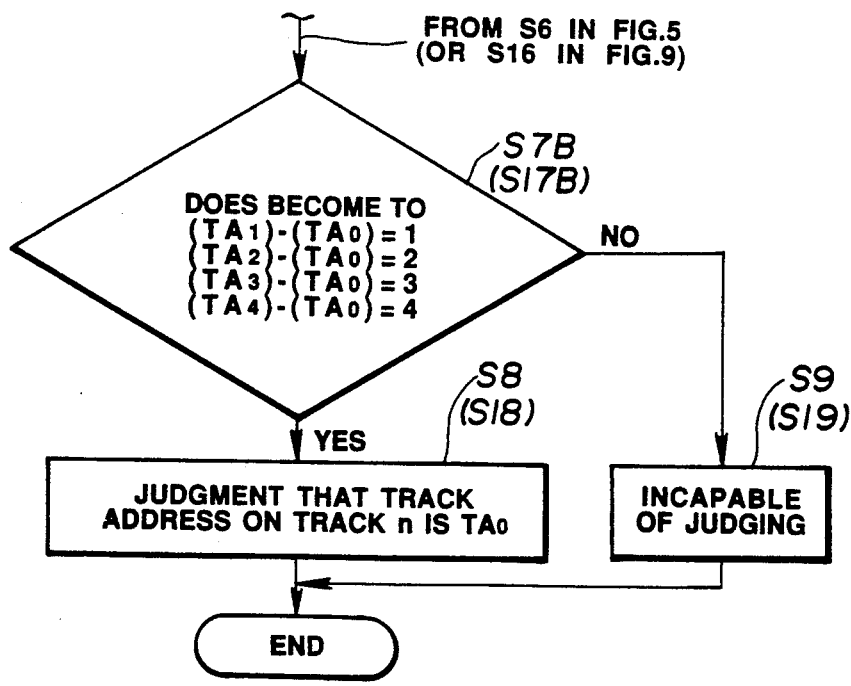
FIG. 11 is a flow chart showing another modification of the track-address judging method.

As shown in a flow chart in FIG. 11, a second modification executes judgment of a step S7B in place of the step S7 in FIG. 5. In the second modification, $TA_0$ is subtracted from $TA_1$ to $TA_4$ in the step S7B, and it is judged whether or not values of the subtraction become 1 to 4 in order. Subsequent steps S8 and S9 are the same as those in FIG. 5.

In connection with the above, the operation expression should not be limited to one in the aforesaid example.

For example, in case $TA_4$ is subtracted from $TA_0$ to $TA_3$, an absolute value may be taken into consideration so as to dispense with the polarity of the subtraction results.

Moreover, as another modification, in case where, at the steps S2 to S6 in FIG. 5, $ID_0$ in which error correction cannot be executed occurs, comparison is not executed in the step S7, but judgment is impossible so that the program may be completed as being "abnormal".

Further, in case where the number of $ID_0$s in which error correction cannot be executed is less than the majority, the remaining $ID_0$s in which error correction can be executed may be used to execute judgment of the address.

Alternatively, in the step S7, in place of the method which simply takes agreement of all the track addresses, the most of timely predominance that judgment may be executed within the remaining time until the optical head passes through the ID 34a (or 34b) may be made to judge the track addresses by the majority logic. For example, in case where the computation results show that $TA_0$ is three and $TA_1$ is two, the addresses on the track n are judged as being $TA_0$ in the step S8.

Figure 12:
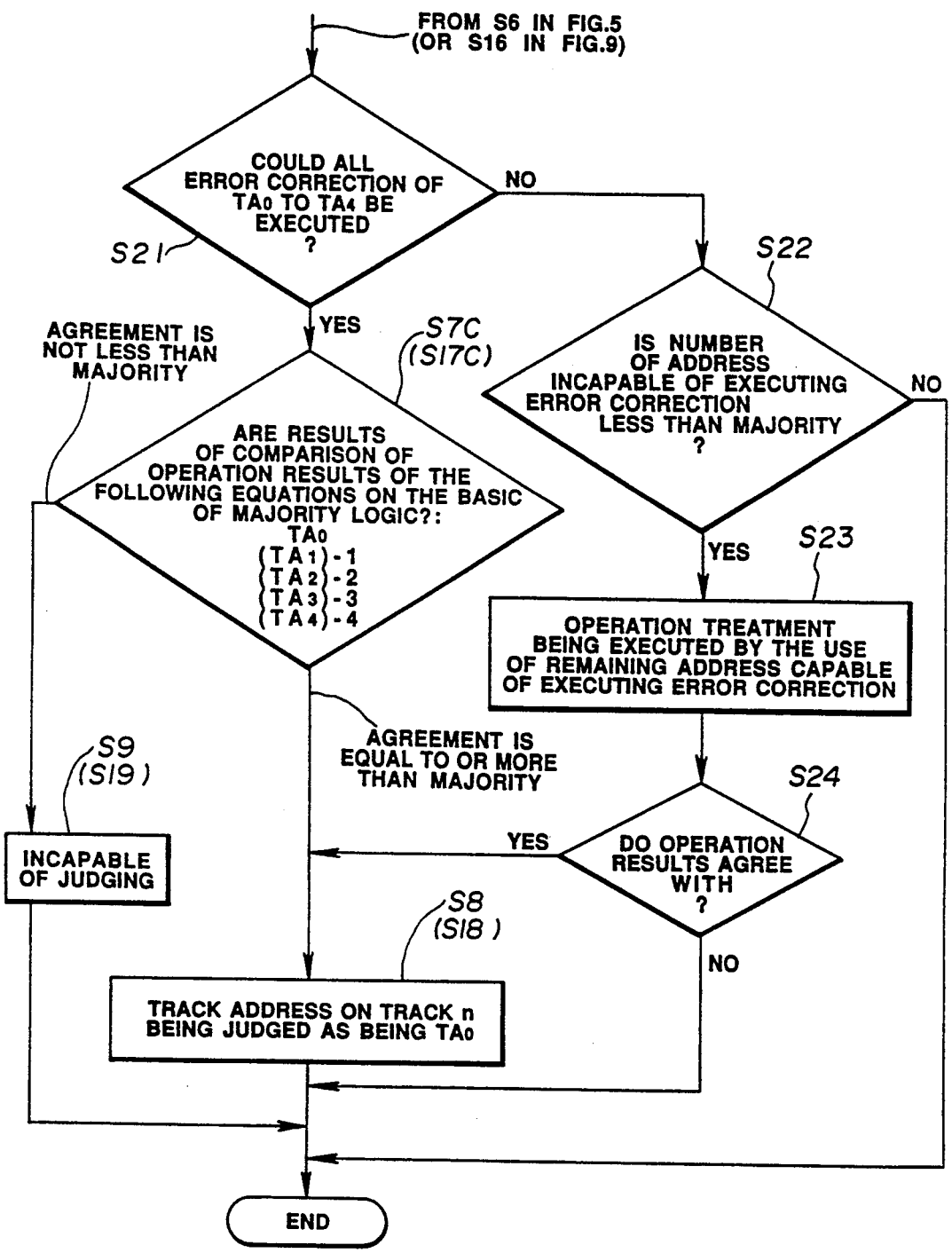
FIG. 12 is a flow chart showing still another modification of the track-address judging method.

An example in which these are brought to a single flow chart is shown in FIG. 12.

In the flow chart in FIG. 12, it is judged whether or not error correction of all TA0 to TA4 can be executed in a step S21, after the step S6 in FIG. 6. In case where $ID_0$s which were impossible in error correction occurs, it is judged in a step S22 whether or not the numbers of $ID_0$s which were impossible in error correction are less than the majority. In a case of "No", the results are that no comparison is made so as to be incapable of being judged, and the program is completed as being "abnormal".

Further, in a case of "Yes", the remaining $ID_0$s in which error correction can be made are used in a step S23 to execute computation processing. An operation expression used here is explained as follows. That is, although as being any one of the aforesaid examples, a remarkable track is brought to a track n, for example. Subsequently, it is judged in a step S24 whether or not the computation results are in agreement with each other. In a case of "Yes", judgment of the address is executed in the step S8. In a case of "No", the results are incapable of being judged, and the program is completed as being "abnormal".

On the other hand, in a case of "Yes" in the step 21, the results of $TA_0$, $(TA_1)-1$, $(TA_2)-2$, $(TA_3)-3$ and $(TA_4)-4$ are judged by the majority logic in a step S7C. In this connection, an operating equation indicated in step S7B (S17B) in FIG. 11 may be used as a substitution for an operating equation indicated in Step S7C (S17C) in FIG. 12. As a result, in case where the coincident numbers are less than the majority, the program is completed as being incapable of being judged, similar to the step S9.

Further, in case where the results show that the coincident numbers are equal to or more than the majority, the addresses of the truck n are judged as being $TA_0$, similarly to the step S8.

In the present embodiment, in order to judge the track addresses, it is possible to produce simultaneously a plurality of track addresses (five in the illustrated example) on the plurality of read-out tracks (five in the illustrated example) within a period of time the optical head passes through the ID section 34a or 34b on which the track addresses are multiple-written. In the present embodiment, simple computation is applied to the plurality of track addresses produced simultaneously, to execute collation of the track addresses, thereby raising the reliability of the reading-out of the track addresses.

In this manner, in the present embodiment, it is possible to use the period of time the optical beam passes through the remaining areas of the ID 34a or 34b, as judgment of the track addresses. The probability of erroneous recognition is therefore reduced, and an attempt can be made to speed-up of time used for judgment of the addresses. In the present embodiment, since the judgment of the track addresses should be made within the period of time of $ID_1$ to $ID_4$, no added burden of additional hardware is necessary.

In the embodiment, the track addresses of the $ID_0$ are read to execute judgment of the track addresses. In case, however, where the $ID_0$ is not correctly or normally read out, similar processing may be executed with respect to $ID_1$ or the like. However, in case where other IDs such as $ID_1$s are used to execute judgment, it is necessary to pay attention to the point that the program must be completed until the optical head passes through the ID 34a area.

Figure 8:
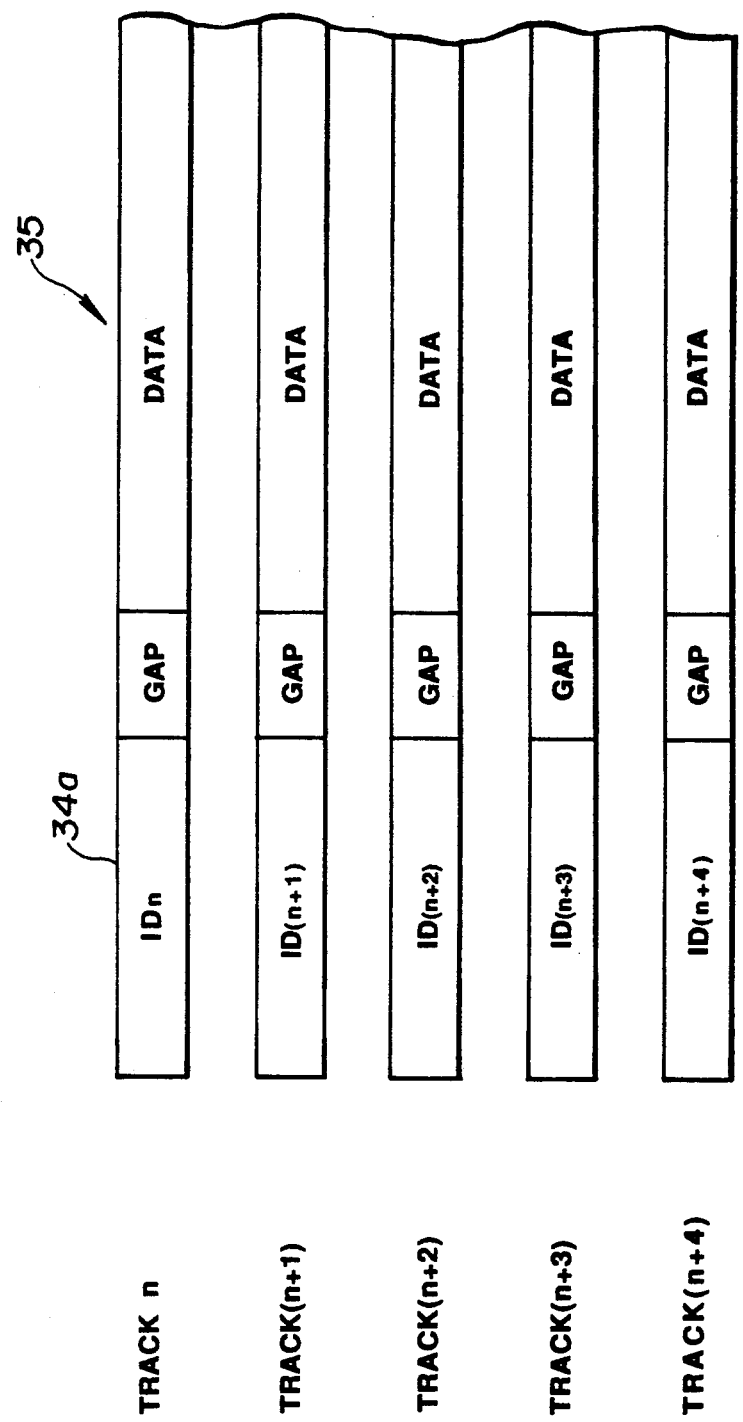
FIG. 8 is a schematic arrangement view of an ID section and an information recording section of a track.
Figure 9:
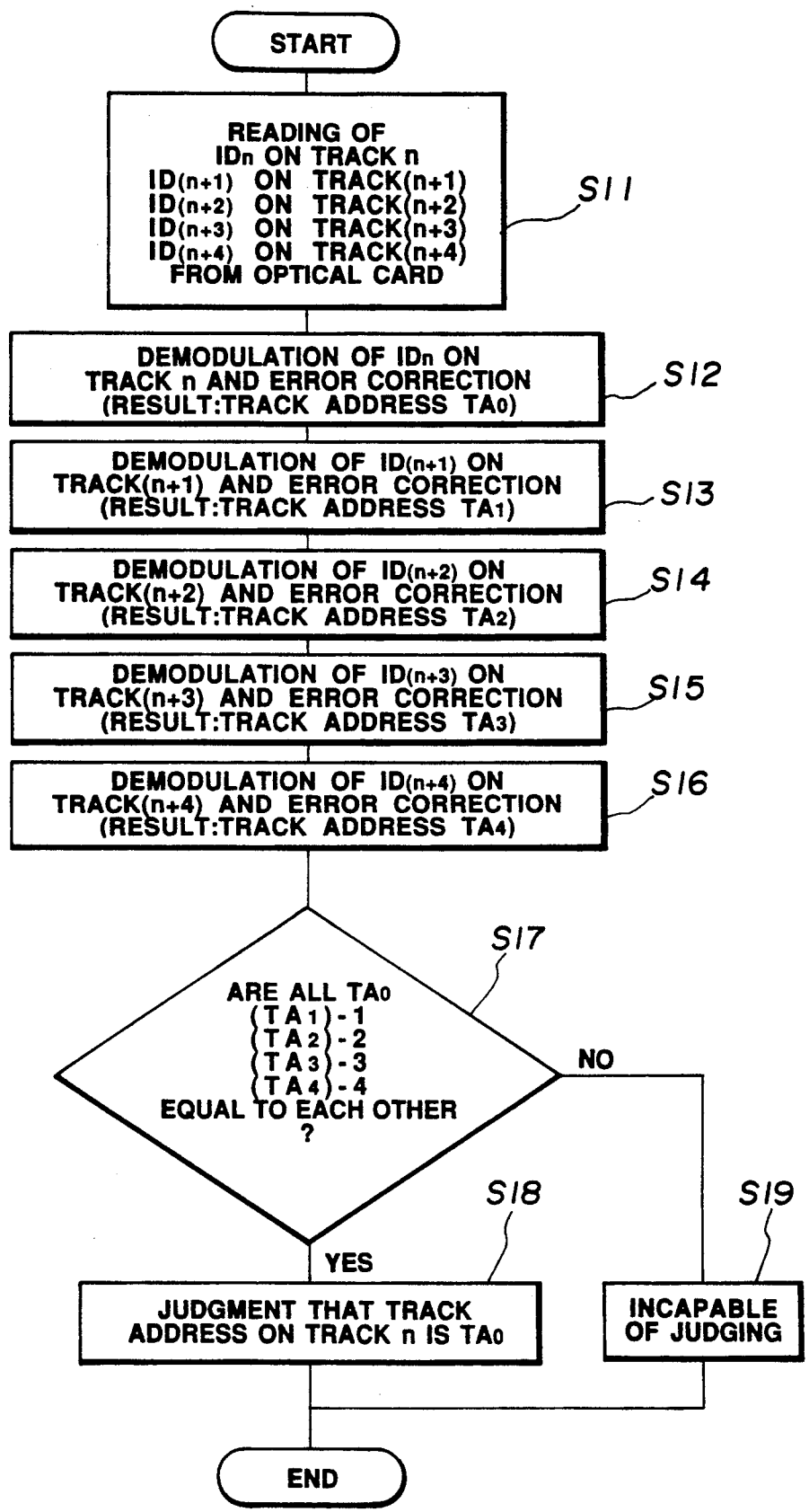
FIG. 9 is a flow chart showing a track-address judging method.

FIGS. 8 and 9 show the second embodiment of the invention. FIG. 8 is a schematic arrangement view showing an information recording section and an ID section of a track, while FIG. 9 is a flow chart relating to the track-address judging method.

First, a recording medium used is substantially the same as the optical card 30 in the first embodiment illustrated in FIG. 5. The description of the same or identical arrangement and function will be omitted, and only different points will be described. The medium of the present embodiment is provided with a track-address information section in which only one track address corresponding to each track is recorded on the ID section 34a and 34b of the plurality of tracks 32. Specifically, the recording medium used in the present embodiment is different from that used in the first embodiment, but is one in which the track address is not multiple-written.

This state or condition is illustrated in FIG. 8 as an example of the ID section 34a. The ID section 34a is provided with $ID_n$, $ID_{(n+1)}$, $ID_{(n+2)}$, $ID_{(n+3)}$ and $ID_{(n+4)}$ on which a single track address corresponding to each of the tracks n, (N+1), (n+2), (n+3) and (n+4), for example, is recorded. Moreover, the ID section 34b is provided with the ID corresponding to each track, similarly to the ID section 34a.

The judging method according to the present embodiment is applicable to an optical card apparatus 1 the same as that according to the first embodiment. The apparatus 1 is the same in arrangement as that according to the first embodiment, and the description thereof will be omitted, but only different operation will be described. In the first embodiment, the track address of $ID_0$ have been read out. In optical card apparatus 1 according to the second embodiment, however, the track addresses of $ID_n$ to $ID_{(n+4)}$ of each track are read out. The controller 6 reads out the track addresses of $ID_n$ to $ID_{(n+4)}$ of the data demodulation signals, and executes judgment of the track addresses to be described as follows.

The method of judging the track addresses, according to the second embodiment, will be described with reference to FIGS. 8 and 9. Specifically, a case where the optical card 30 is mounted on the optical card apparatus 1, and information is read out will be described as an example. In this connection, the ID sections 34a and 34b on the optical card 30 read out simultaneously five tracks, as illustrated in FIG. 8, for simplification of the description.

First, referring to FIG. 8, the operational contents at time the optical beam passes through the left-hand ID section 34a of the five tracks will be described in due course.

First, when the optical spot passes through the region of ID 34a, $ID_{n, (n+1)}$, (n+2), (n+3) and (n+4) of the respective tracks n, (n+1), (n+2), (n+3) and (n+4) are simultaneously read out from the optical card 30, are binary-coded, and are stored respectively in the memories 5.

At the time the optical head passes through the $ID_n$, the memory 5a in which the binary signal of $ID_n$ on the track n is stored is read out, demodulation is executed, and the error correction results are stored in the memory 11. Subsequently, the memory 5b in which the binary signal of the $ID_{(n+1)}$ on the track (n+1) is stored is read out, demodulation is executed, and the error correction results are stored in the memory 11. Hereunder, similar operations are executed respectively with respect to the $ID_{(n+2)}$, (n+3) and (n+4) on the tracks (n+2), (n+3) and (n+4).

FIG. 9 shows an example of a flow chart of the track-address judging method according to the second embodiment.

First, in a step S11, when the optical head passes through the area of $ID_0$, the $ID_{n, (n+1), (n+2), (n+3)}$ and $(n+4)$ on the respective tracks n, (n+1), (n+2), (n+3) and (n+4) are simultaneously read out from the optical card 30, are binary-coded, and are stored respectively in the memories 5.

In a step S12, at time the optical head passes through the $ID_0$, the memory 5a in which the binary signal of the $ID_n$ on the track n is stored is read out, demodulation is executed, and the error correction processing is executed to obtain a track address $TA_0$. The track address $TA_0$ is stored in the memory 11.

Subsequently, in a step S13, the memory 5b in which the binary signal of $ID_{(n+1)}$ on the track (n+1) is stored is read out, demodulation is executed, and the error correction processing is executed, to store the track address $TA_1$ into the memory 11. Hereunder, in a step S14 to a step S16, similar operations are executed respectively with respect to the $ID_{(n+2)}$ on the track (n+2), $ID_{(n+3)}$ on the track (n+3), $ID_{(n+4)}$ on the track (n+4), to obtain the track addresses $TA_2$ to $TA_4$.

The processing in the step S11 to a step S18 or a step S19 is completed within the period of time until the optical spot from the optical head reaches the information recording area 35, that is, within the period of time until the optical spot passes through the gaps. Since the track address is judged before entering the information recording area 35, operation starts in which the information of the tracks n to (n+4) is read out, or information is recorded on an optional track of the tracks n, or the tracks n to (n+4), if it is confirmed that light beam is positioned at the target track n on the basis of the judgment results.

In connection with the above, although, in the figure, description was made to the left-hand ID 34a, it is needless to say that the same can be made by the use of the right-hand ID 34b. Further, modification of the operation expression for comparison can be made similarly to the first embodiment. The flow charts illustrated in FIGS. 10 and 11 can also be applied to the second embodiment of the invention. In this connection, the numbers of steps S within ( ) indicate the present embodiment.

Alternatively, in the illustrated example, of the five tracks to be read out, the track addresses of all the five ($ID_n$ to $ID_{(n+4)}$) are demodulated, and the error correction is executed. However, the arrangement may be such that demodulation and error correction are executed with respect to at least two addresses, to execute judgment of the track addresses.

Alternatively, in case where the $ID_n$ to $ID_{(n+4)}$ in which error correction cannot be made are generated in the step S12 to the step S16, comparison is not made and judgment is impossible in the step S17 so that the program may be completed as being "abnormal". Moreover, in case where the number of the $ID_0$s in which error correction cannot be made is less than the majority, the arrangement may be such that the remaining $ID_0$s in which the error correction can be made are used to execute judgment of the addresses.

Alternatively, in the step S17, the track addresses may be judged by the majority logic, in place of a method in which agreement of all is simply taken.

The flow chart illustrated in FIG. 12 can be applied also to the second embodiment of the invention. In this connection, the numbers of the steps S within ( ) indicate those of the present embodiment.

In the present embodiment, the recording medium in which the track addresses are not multiple-written onto the ID section is used to obtain track addresses from the plurality of tracks adjacent to the track addresses to be judged, thereby executing judgment. Accordingly, similarly to the conventional recording medium having track addresses multiple-written, it is possible to execute judgment of the track addresses, high in reliability. Specifically, since, in the present track-address judgment method, it is made unnecessary to multiple-write the track addresses of the recording medium, while the error rate of the track address recognition is restrained low, it is possible to increase the memory capacity of the recording medium correspondingly to the unnecessary portion.

In connection with the above, as the recording medium, the optical card is shown which is provided with the ID sections respectively on both left- and right-hand ends in the single track. However, the invention is effective also for an optical card provided with a single ID section on a single track. In this case, a memory capacity increases more than that of the previous embodiment. Further, the judging method according to the present embodiment is naturally applicable to that in which the addresses are multiple-written, similarly to the first embodiment, as a reading medium.

In connection with the above, although not limited to the apparatus in which the optical card is mounted as the recording medium, the invention is applicable also to an apparatus of type of reading out a plurality of tracks, with respect to reproducing-type, supplementing-type and writable-type discs.

It is evident that, in this invention, various embodiments different from each other in a wide scope can be formed on the basis of the spirit of the invention. This invention should not be limited by the specific embodiments, except for being limited by the appended claims.

What is claimed is:

1. A track-address judging method which is used in an optical information recording and reproducing apparatus in which, with respect to a recording medium having a plurality of tracks, each of the plurality of tracks including at least one track address information section, track addresses being multiple-written respectively within each of the plurality of tracks, and each of the plurality of tracks including an information recording area executing at least one of recording and reproducing of the information, an optical spot being irradiated to the plurality of tracks of the recording medium, to simultaneously read out the information of the plurality of tracks for judging the track addresses of a desired track of said plurality of tracks, said method comprising the steps of:

simultaneously reading out one of the multiple-written track addresses for each of the plurality of tracks, from the track address information sections in at least two tracks of said plurality of tracks; and judging a track address of a desired track according to a comparison of each track address read out from at least two tracks in said reading step during a period of time the optical spot reaches the information recording area from the remaining multiple-written track addresses.

2. A track-address judging method which is used in an optical information recording and reproducing apparatus in which, with respect to a recording medium having a plurality of tracks, each of the plurality of tracks including at least one track address information section, one track address being written respectively within each of the plurality of tracks, and each of the plurality of tracks including an information recording area executing at least one of recording and reproducing of the information, an optical spot being irradiated to the plurality of tracks of the recording medium, to simultaneously read out the information of the plurality of tracks for judging the track addresses of a desired track of said plurality of tracks, said method comprising the steps of:

simultaneously reading out each of the track addresses from the track address information sections in at least two tracks of said plurality of tracks; and judging a track address of a desired track according to a comparison of each track address read out from at least two tracks in said reading step during a period of time the optical spot reaches the information recording area.

3. A track-address judging method according to claim 1, wherein the multiple-written track addresses for each track read out by said reading-out step each consists of a track address read out first in time.

4. A track-address judging method according to claim 1 or 2, wherein said judging step, a desired one of said at least two tracks is selected as a reference, and wherein a difference between the reference track number and each of the numbers of the other tracks is produced by at least one of addition of or subtraction from each of the numbers of the other tracks, to judge the track address of the desired reference track.

5. A track-address judging method according to claim 1 or 2, wherein, in said judging step, a desired one of said at least two tracks is selected as a reference, wherein the reference track number is subtracted from each of the numbers of the other tracks, and wherein, whenever an absolute value of said subtraction is in agreement with a difference in number between each of the numbers of the other tracks and the reference track number, the track address is judged assuming that the desired track is collated.

6. A track-address judging method according to claim 1 or 2, wherein said reading-out step includes a step of executing error correction of said read-out track address, wherein, during said step of executing the error correction of said read-out track address, whenever a track address in which a generated error cannot be corrected, said judging step is not performed.

7. A track-address judging method according to claim 1 or 2, wherein said reading-out step includes a step of executing error correction of each of said read-out track addresses; and in said judging step, whenever the track addresses incapable of executing error correction are less than the majority in said step of executing the error correction, one track of the track addresses capable of being executed in error correction is selected as a reference, a difference between each of the numbers of the remaining other tracks and the number of the reference track is produced by at least one of addition of or subtraction from each of the numbers of the other tracks, to judge the track address of the reference track.

8. A track-address judging method according to claim 4, wherein, in said judging step, whenever the results in which the difference between each of the numbers of the other tracks and the numbers of the reference tracks is produced by at least one of addition of or subtraction from said each of the numbers of the other tracks are all in agreement with each other, the coincident track address is judged as being the track address of the desired track.

9. A track-address judging method according to claim 4, wherein the results in which the difference between the number of the reference track and each of the numbers of the other tracks is produced by at least one of addition of or subtraction from each of the numbers of the other tracks are not in agreement with each other, judgment is impossible and the method is completed as being abnormal.

10. A track-address judging method according to claim 4, wherein, in said judging step, whenever the results in which the difference between each of the numbers of the other tracks and the number of the reference track is produced by at least one of addition of or subtraction from each of the numbers of the other tracks are at least partially in agreement with each other, the track address decided by majority logic is judged as being the track address of the desired track.

11. A track-address judging method according to claim 4, wherein, in said judging step, whenever a difference between each of the numbers of the other tracks and the number of the reference track is produced by at least one of addition of or subtraction from said each of the numbers of the other tracks, the number of the track addresses in agreement with each other are at least the majority, judgment is being executed, and the judging method is completed as abnormal.

12. A track-address judging method according to claim 4, wherein, in said judging step, whenever a difference between each of the numbers of the other tracks and the number of the reference track is produced by at least one of addition of or subtraction from said of the numbers of the other tracks, the number of the track addresses in agreement with each other is at least equal to the majority, the track addresses wholly in agreement with each other are judged as being track addresses of the desired track.

13. A track-address judging method according to claim 7, wherein, in said judging step, a desired one of said at least two tracks is selected as a reference, wherein the reference track number is subtracted from each of the numbers of the other tracks, and wherein, whenever an absolute value of said subtraction is in agreement with a difference in number between each of the numbers of the other tracks and the reference track number, the track address is judged assuming that the desired track is collated.

14. A track-address judging method according to claim 5, wherein, in said judging step, whenever an absolute value of said subtraction is in agreement with a difference in number between each of the numbers of the other tracks and the reference track number, and, whenever a difference between each of the numbers of the other tracks and the number of the reference track is subtracted from said each of the numbers of the other tracks, the number of the track addresses in agreement with each other are at least the majority judgment is being executed, and the judging method is completed as abnormal.

* * * * *